United States Patent
Wu et al.

(10) Patent No.: US 9,769,790 B2
(45) Date of Patent: Sep. 19, 2017

(54) METHOD AND DEVICE FOR PAGING TERMINAL

(71) Applicant: ZTE Corporation, Shenzhen (CN)

(72) Inventors: Hao Wu, Shenzhen (CN); Fang Xie, Shenzhen (CN)

(73) Assignee: XI'AN ZHONGXING NEW SOFTWARE CO. LTD, Xi'an (CN)

( * ) Notice: Subject to any disclaimer, the term of this patent is extended or adjusted under 35 U.S.C. 154(b) by 0 days.

(21) Appl. No.: 14/917,754

(22) PCT Filed: May 23, 2014

(86) PCT No.: PCT/CN2014/078338
§ 371 (c)(1),
(2) Date: Mar. 9, 2016

(87) PCT Pub. No.: WO2014/187366
PCT Pub. Date: Nov. 27, 2014

(65) Prior Publication Data
US 2016/0227512 A1  Aug. 4, 2016

(30) Foreign Application Priority Data
Sep. 10, 2013  (CN) .......................... 2013 1 0429652

(51) Int. Cl.
*H04W 68/00* (2009.01)
*H04W 68/02* (2009.01)
*H04W 8/06* (2009.01)

(52) U.S. Cl.
CPC ........... *H04W 68/005* (2013.01); *H04W 8/06* (2013.01); *H04W 68/02* (2013.01); *Y02B 60/50* (2013.01)

(58) Field of Classification Search
CPC .................................................. H04W 68/005
See application file for complete search history.

(56) References Cited

U.S. PATENT DOCUMENTS

| 2012/0120789 A1 | 5/2012 | Ramachandran | |
|---|---|---|---|
| 2016/0029269 A1* | 1/2016 | Tamura | H04W 36/0022 455/436 |
| 2016/0183156 A1* | 6/2016 | Chin | H04W 36/0022 370/331 |

FOREIGN PATENT DOCUMENTS

| CN | 1941993 A | 4/2007 |
|---|---|---|
| CN | 101448305 A | 6/2009 |

(Continued)

OTHER PUBLICATIONS

European Search Report for corresponding application EP 14 80 0887; Report Dated Aug. 25, 2016.
(Continued)

*Primary Examiner* — Justin Lee
(74) *Attorney, Agent, or Firm* — Cantor Colburn LLP

(57) ABSTRACT

Provided are a method and a device for paging a terminal. The device includes: a mobile management element configured to manage access control, status judgment and signaling exchange with other control components of a terminal; a visited location register configured to store paging information of the terminal and transmit a paging request according to the paging information. The method and the device solve the defect that that network resources are wasted as a system cannot judge the status of a terminal under a sleep or a power saving mode, and wrong information is fed back, and an ineffective paging request is repeatedly transmitted in the related art, and improve the working efficiency of the whole network.

7 Claims, 2 Drawing Sheets

(56) References Cited

FOREIGN PATENT DOCUMENTS

| | | |
|---|---|---|
| CN | 103200554 A | 7/2013 |
| WO | 2012174943 A1 | 12/2012 |
| WO | 2014005452 A1 | 1/2014 |

OTHER PUBLICATIONS

International Search Report for corresponding application No. PCT/CN2014/078338 filed on May 23, 2014; Mail date Sep. 22, 2014.

* cited by examiner

METHOD AND DEVICE FOR PAGING TERMINAL

TECHNICAL FIELD

The present disclosure relates to the field of wireless terminal communications, and in particular to a method and a device for paging a terminal.

BACKGROUND

A cellular wireless communication system mainly comprises a Core Network (CN), a Radio Access Network (RAN) and a User Equipment (UE). The CN takes charge of transactions of a non access layer; the RAN includes a base station or a base station and a base station control, and takes charge of transactions of an access layer; terminals, i.e., UEs, are various types of equipment which can communicate with a cellular wireless communication network.

As the communication industry has been developed up to now, there are various types of services; similarly, demands of customers become richer and richer, and requirements are higher and higher. Different services have different characteristics; for example, a position reporting terminal on a vehicle only needs to report the current position of the vehicle when the vehicle reaches a certain appointed location or according to an appointed period instead of communicating with a network all the time. Therefore, such a terminal has a power saving mode; under the power saving mode, sleep time is set; the terminal neither receive any paging message nor communicate with the network within the sleep time; the terminal can transmit and receive data and receive the paging message only within active time. At that time, when the network transmits a paging request to the terminal, the terminal will not feed back any information; when a response of the terminal cannot be obtained, the network will consider by a mistake that the terminal is off-line, and feed back wrong information to a system.

SUMMARY

The embodiment of the present disclosure solves the problem of a defect that network resources are wasted as the status of a terminal under a sleep or power saving mode cannot be judged, wrong information is fed back to a system, and an ineffective paging request is repeatedly transmitted in the related art.

According to one embodiment of the present disclosure, a method for paging a terminal is provided, and the method comprises: receiving, by a mobile management element, a paging request of a visited location register for paging a terminal, and inquiring a status parameter of the paged terminal; judging, by the mobile management element, whether the paged terminal is in a sleep state according to the status parameter of the paged terminal, and when the paged terminal is in the sleep state, transmitting a signaling to inform the visited location register that the paged terminal is in the sleep state.

According to an example embodiment, after the visited location register receives the signaling, the method further comprises: transmitting, by the visited location register, a paging request to the mobile management element again according to content of the signaling.

According to an example embodiment, the signaling is: "SGsAP-UE-UNREACHABLE" or "SGsAP-PAGING-REJECT", and comprises a cause value which is configured as: "terminal unreachable" or "terminal in a power saving mode".

According to an example embodiment, the signaling "SGsAP-UE-UNREACHABLE" or "SGsAP-PAGING-REJECT" further comprises: time when the terminal enters an active status next time.

According to an example embodiment, the visited location register transmits the paging request to the mobile management element again according to the time when the terminal enters the active status next time, wherein the time is in the signaling "SGsAP-UE-UNREACHABLE" or "SGsAP-PAGING-REJECT".

According to another aspect of the present disclosure, a device for paging a terminal is provided, and the device comprises: a mobile management element, configured to manage access control, status judgment of a mobile terminal and signaling exchange with other control components; a visited location register, configured to store paging information of the terminal and transmit a paging request according to the paging information.

According to an example embodiment, the visited location register is configured to transmit the paging request to the mobile management element; and the mobile management element is configured to, after receiving the paging request, inquire status information of the paged terminal; and when the paged terminal is in a sleep state, transmit a signaling to inform the visited location register that the paged terminal is in the sleep state.

According to an example embodiment, the visited location register is configured to, after receiving the signaling, transmit a paging request to the mobile management element again according to content of the signaling.

According to an example embodiment, the signaling is "SGsAP-UE-UNREACHABLE" or "SGsAP-PAGING-REJECT", and comprises at least one of a cause value and time when the terminal enters an active status next time; wherein the cause value is configured as: "terminal unreachable" or "terminal in a power saving mode".

According to an example embodiment, the visited location register is configured to transmit the paging request to the mobile management element again according to the time when the terminal enters the active status next time, wherein the time is in the signaling "SGsAP-UE-UNREACHABLE" or "SGsAP-PAGING-REJECT".

The present disclosure solves the defect that network resources are wasted as a system cannot judge the status of a terminal under a sleep or power saving mode, wrong information is fed back and an ineffective paging request is repeatedly transmitted in the related art, and improves the working efficiency of the whole network.

BRIEF DESCRIPTION OF THE DRAWINGS

The drawings described here are to provide a further understanding of the present disclosure, and form one part of the application, and schematic embodiments and descriptions of the embodiments of the present disclosure are to explain the present disclosure, but do not form an improper limit to the present disclosure. In the drawings.

DETAILED DESCRIPTION OF THE EMBODIMENTS

A preferred embodiment of the present disclosure is provided below with the drawings to describe the technical solution of the present disclosure in detail. It should be noted that, under a condition of no conflicts, the embodiments and characteristics in the embodiments of the present disclosure can be combined.

Embodiment 1

A method for paging a terminal is provided in the embodiment of the present disclosure, and the method mainly includes the following steps that: 1. a mobile management element receives a paging request of a visited location register for a terminal, and inquires a status parameter of the paged terminal; 2. the mobile management element judges whether the paged terminal is in a sleep state according to the status parameter of the paged terminal, and transmits a signaling to inform the visited location register that the terminal is in the sleep state.

Figure 1:
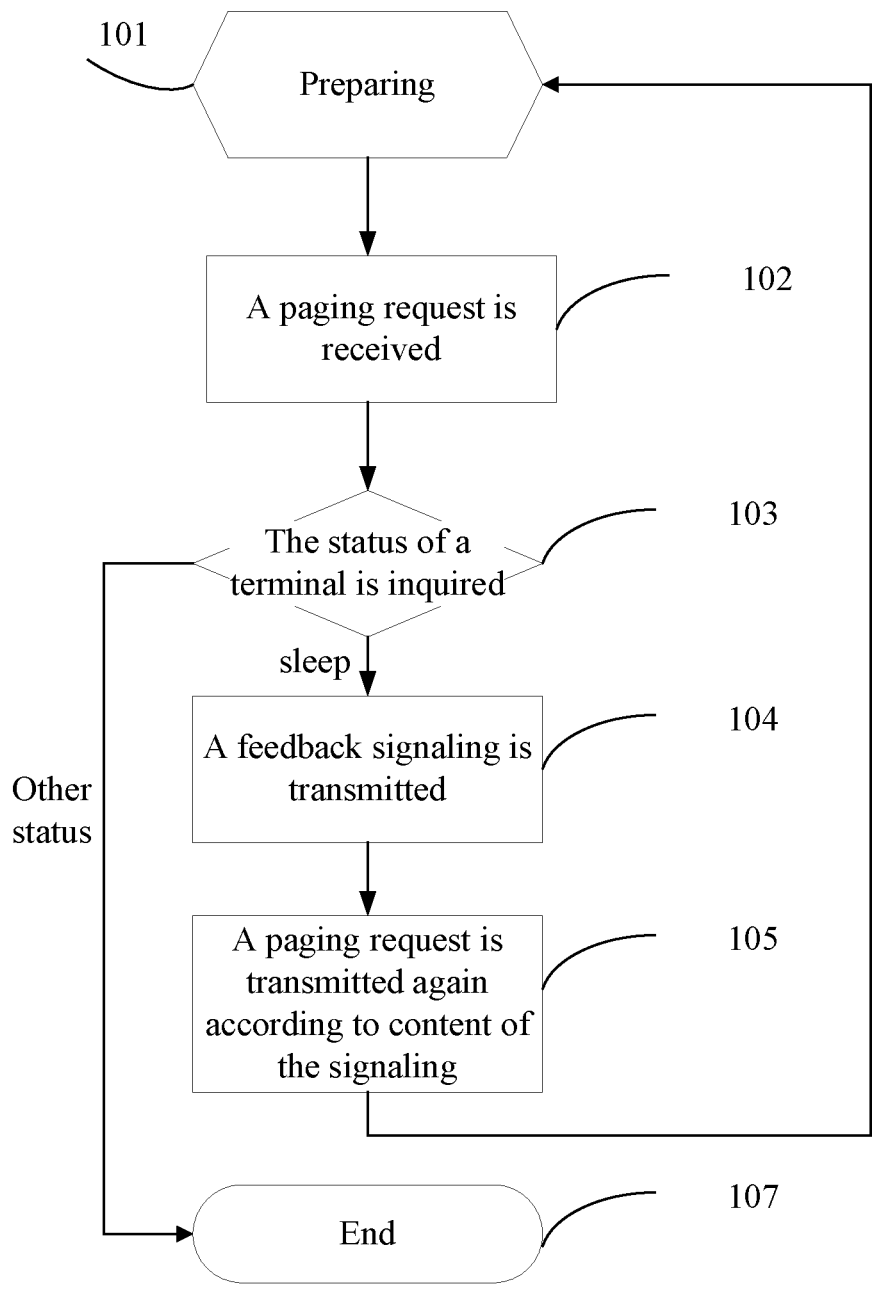
FIG. 1 is a flowchart of a method for paging a terminal according to the present disclosure.

FIG. 1 is a flowchart of a method for paging a terminal according to the present disclosure, and describes the present disclosure in detail. The method includes main steps that:

Step 101: a system is operated and waits to receive a task instruction;

Step 102: a mobile management element receives a paging request of a visited location register for paging a terminal;

Step 103: the mobile management element inquires in the system context information of the paged terminal in the system according to the paging request, and inquires a current status of the terminal from the context information; when the terminal is in a sleep state, Step 104 is executed; when the terminal is in other status, Step 107 is executed, and then the current task is ended, to enter the next stage;

Step 104: the mobile management element adds information that indicates that the terminal is in the sleep state into a cause value of a signaling "SGsAP-UE-UNREACHABLE" or "SGsAP-PAGING-REJECT", to feed back the signaling to the visited location register.

Another optional solution of a method for paging the terminal is provided, that is, Step 105 is added after Step 104.

Step 105: the visited location register transmits a paging request to the mobile management element again according to the time when the terminal enters the active status next time, wherein the time is in the signaling "SGsAP-UE-UNREACHABLE" or "SGsAP-PAGING-REJECT" fed back by the mobile management element.

In the above, the paging request message includes an Initial Addressing Message (IAM); the IAM includes an International Mobile Subscriber identity (IMSI) of the paged terminal; the mobile management element inquires the current status of the corresponding terminal according to the IMSI. The message includes the following content:

| Information element | Remarks |
|---|---|
| Message type | Marking that the current signaling is "SGsAP-PAGING-REQUEST" |
| IMSI | Identity of the paged terminal |
| VLR name | Name of the visited location register that transmits a paging request signaling currently |
| Service indicator | Indicating whether a paged service is a voice service or a short message service |

After the current status of the terminal is inquired, it is judged whether the terminal is in a sleep state; when the terminal is in the sleep state, a signaling is transmitted to the visited location register; the content of the signaling comprises: a cause value and the time when the terminal enters the active status next time; the cause value may be further configured as: "terminal unreachable" or "terminal in the power saving mode". The signaling includes the following content:

Mode 1:

| Information element | Remarks |
|---|---|
| Message type | Indicating whether the current message is "SGsAP-UE-UNREACHABLE" or "SGsAP-PAGING-REJECT" |
| IMSI | Identity of the paged terminal |
| SGs cause | Cause why the terminal is unreachable, wherein the cause is set as "terminal in a power saving mode" or "terminal unreachable" |
| Time to activate | Time left for activating the terminal next time, for example: 10 minutes left for the terminal entering the active status |

Mode 2:

| Information element | Remarks |
|---|---|
| Message type | Indicating whether the current message is "SGsAP-UE-UNREACHABLE" or "SGsAP-PAGING-REJECT" |
| IMSI | Identity of the paged terminal |
| SGs cause | Cause why the terminal is unreachable, wherein the cause is set as "terminal in a power saving mode" or "terminal unreachable" |
| Active time | Specific activation time period of the terminal, for example, the time period of activating the terminal next time is from 20:00 to 20:10 |

The "Time to active" and the "Active time" here list two modes for indicating the next activation time of the terminal.

In actual application, the existing status classification can be used for the status of the terminal in Step 103, wherein the existing status classification comprises: terminal on-line, terminal off-line, terminal unknown and terminal unreachable; at that time, information of sleep of the terminal is set in the class of the terminal unreachable. Or a new status classification can be used, wherein the new status classification comprises: terminal on-line, terminal off-line, terminal unknown, terminal unreachable and terminal in a power saving mode; at that time, information of sleep of the terminal is set in the class of the terminal in a power saving mode. In the above, the terminal off-line is that after being registered to a network, the terminal can be automatically off-line under the condition of not applying for being off-line, and the system cannot page the terminal; the terminal unknown is that the paged terminal is not registered to the system, that is, the terminal does not exist in the system, and accessing-network information of the terminal is not received.

Embodiment 2

By virtue of the method for paging the terminal, a device for implementing the method is further provided in the present disclosure, including: a mobile management element 2 and a visited location register 3.

Figure 2:
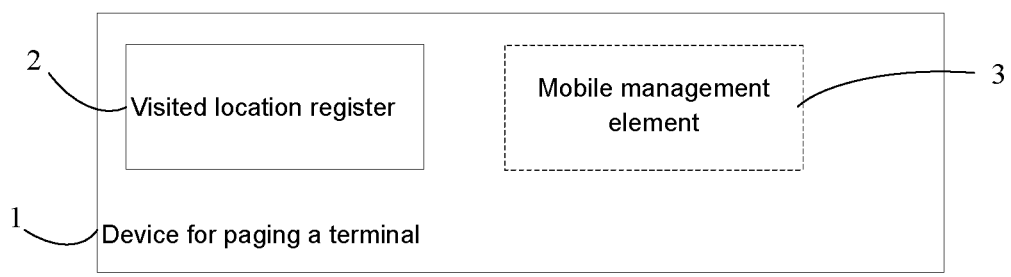
FIG. 2 is a structure diagram of a device for paging a terminal according to the present disclosure.

As shown in FIG. 2, the device 1 for paging a terminal includes: a mobile management element 2 configured to manage access control, status judgment of a mobile terminal and signaling exchange with other control components; a visited location register 3 configured to store paging information of the terminal and transmit a paging request according to the paging information.

There is a mutual logic relation among the components and elements in the device 1 for paging the terminal, and the components and elements are connected with one another. A technical effect achieved by the device 1 for paging the terminal is implemented by combining the device for paging a terminal and an existing communication system. When there is a task for paging a terminal in the system, the visited location register 3 in the system transmits a terminal paging request to the mobile management element 2; after receiving the paging request, the mobile management element inquires status information of the paged terminal according to an International Mobile Subscriber Identity (IMSI) in an Initial Addressing Message (IAM) in the paging request; the paging message includes the following content:

| Information element | Remarks |
| --- | --- |
| Message type | indicating that the current signaling is "SGsAP-PAGING-REQUEST" |
| IMSI | Identity of the paged terminal |
| VLR name | Name of the visited location register that transmits a paging request signaling currently |
| Service indicator | Indicating whether a paged service is a voice service or a short message service |

When the terminal is in a sleep state, a signaling "SGsAP-UE-UNREACHABLE" or "SGsAP-PAGING-REJECT" is transmitted to inform the visited location register 3; the signaling includes but is not limited to the following two modes:

Mode 1:

| Information element | Remarks |
| --- | --- |
| Message type | Indicating whether the current message is "SGsAP-UE-UNREACHABLE" or "SGsAP-PAGING-REJECT" |
| IMSI | Identity of the paged terminal |
| SGs cause | Cause why the terminal is unreachable, wherein the cause is set as "terminal in a power saving mode" or "terminal unreachable" |
| Time to activate | Time left for activating the terminal next time, for example: 10 minutes left for the terminal entering the active status |

Mode 2:

| Information element | Remarks |
| --- | --- |
| Message type | Indicating whether the current message is "SGsAP-UE-UNREACHABLE" or "SGsAP-PAGING-REJECT" |
| IMSI | Identity of the paged terminal |
| SGs cause | Cause why the terminal is unreachable, wherein the cause is set as "terminal in power saving mode" or "terminal unreachable" |
| Active time | Specific activation time period of the terminal, for example, the time period of activating the terminal next time is from 20:00 to 20:10 |

The "Time to active" and the "Active time" here list two modes for indicating the next activation time of the terminal.

An optional solution is further provided in the embodiment; after receiving the fed back signaling "SGsAP-UE-UNREACHABLE" or "SGsAP-PAGING-REJECT", the visited location register transmits a paging request to the mobile management element 2 again according to the time when the terminal enters the active status next time in the signaling.

Although the specific implementation modes of the present disclosure are described, those skilled in the art should understand that these are only illustrations, and the scope of protection of the present disclosure is defined according to the attached claims. Those skilled in the art can make various changes or modifications on these implementation modes without departing from the spirit and the substance of the present disclosure, but these changes and modifications shall fall within the scope of protection of the present disclosure.

The invention claimed is:

1. A method for paging a terminal, comprising:
   receiving, by a mobile management element, a paging request of a visited location register for paging a terminal, and inquiring a status parameter of the paged terminal;
   judging, by the mobile management element, whether the paged terminal is in a sleep state according to the status parameter of the paged terminal, and when the paged terminal is in the sleep state, transmitting a signaling to inform the visited location register that the paged terminal is in the sleep state;
   wherein after the visited location register receives the signaling, the method further comprises: transmitting, by the visited location register, the paging request to the mobile management element again according to content of the signaling.

2. The method for paging the terminal as claimed in claim 1, wherein the signaling is "SGsAP-UE-UNREACHABLE" or "SGsAP-PAGING-REJECT", and comprises a cause value which is configured as: "terminal unreachable" or "terminal in a power saving mode".

3. The method for paging the terminal as claimed in claim 2, wherein the signaling "SGsAP-UE-UNREACHABLE" or "SGsAP-PAGING-REJECT" further comprises:
   time when the terminal enters an active status next time.

4. The method for paging the terminal as claimed in claim 3, wherein the visited location register transmits the paging request to the mobile management element again according to the time when the terminal enters the active status next time, wherein the time is in the signaling "SGsAP-UE-UNREACHABLE" or "SGsAP-PAGING-REJECT".

5. A device for paging a terminal, comprising:
   a mobile management element, configured to manage access control, status judgment of a mobile terminal and signaling exchange with other control components;
   a visited location register, configured to store paging information of the terminal and transmit a paging request according to the paging information;
   wherein the visited location register is configured to transmit the paging request to the mobile management element and the mobile management element is configured to, after receiving the paging request, inquire status information of the paged terminal; and when the paged terminal is in a sleep state, transmit a signaling to inform the visited location register that the paged terminal is in the sleep state;
   wherein the visited location register is configured to, after receiving the signaling, transmit the paging request to the mobile management element again according to content of the signaling.

6. The device for paging the terminal as claimed in claim 5, wherein the signaling is "SGsAP-UE-UNREACHABLE" or "SGsAP-PAGING-REJECT", and the signaling comprises at least one of a cause value and time when the terminal enters an active status next time; wherein the cause value is configured as: "terminal unreachable" or "terminal in a power saving mode".

7. The device for paging the terminal as claimed in claim 6, wherein the visited location register is configured to transmit the paging request to the mobile management element again according to the time when the terminal enters the active status next time, wherein the time is in the signaling "SGsAP-UE-UNREACHABLE" or "SGsAP-PAGING-REJECT".

* * * * *